United States Patent
Schinner

(10) Patent No.: US 7,180,545 B2
(45) Date of Patent: Feb. 20, 2007

(54) SYSTEM AND METHOD FOR REDEYE STROBE MODE CONTROL

(75) Inventor: Charles E. Schinner, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 731 days.

(21) Appl. No.: 10/355,692

(22) Filed: Jan. 31, 2003

(65) Prior Publication Data

US 2004/0150743 A1    Aug. 5, 2004

(51) Int. Cl.
*H04N 5/222* (2006.01)
(52) U.S. Cl. .................................... 348/371; 348/370
(58) Field of Classification Search ............... None
See application file for complete search history.

(56) References Cited

U.S. PATENT DOCUMENTS

| | | | | |
|---|---|---|---|---|
| 5,198,855 | A * | 3/1993 | Iwai | 396/166 |
| 5,220,364 | A * | 6/1993 | Kobayshi et al. | 396/63 |
| 5,563,679 | A * | 10/1996 | Dobashi et al. | 396/158 |
| 6,215,961 | B1 * | 4/2001 | Mukai et al. | 396/100 |
| 6,421,504 | B1 * | 7/2002 | Saito et al. | 348/371 |
| 6,700,619 | B1 * | 3/2004 | Hamamura | 348/370 |

FOREIGN PATENT DOCUMENTS

| | | | |
|---|---|---|---|
| JP | 06-118486 | * | 4/1994 |
| JP | 08-271954 | | 10/1996 |

* cited by examiner

*Primary Examiner*—David Ometz
*Assistant Examiner*—Luong T. Nguyen

(57) ABSTRACT

A method and apparatus for controlling a flash that automatically selects between normal flash mode and redeye reduction flash mode is disclosed. The apparatus measures the light in the scene, and based on this measurement, chooses between the redeye reduction flash mode and the normal flash mode. The apparatus may also measure the distance to the object and use this information to help chooses which flash mode to use.

8 Claims, 4 Drawing Sheets

SYSTEM AND METHOD FOR REDEYE STROBE MODE CONTROL

FIELD OF THE INVENTION

The field of this invention relates to digital imaging systems and more specifically to a digital imaging system that automatically controls the strobe for redeye reduction.

BACKGROUND OF THE INVENTION

Digital imaging devices typically have a strobe or flash to add illumination to a scene. In many digital imaging devices, the scene illumination, or brightness, is measured using the photo-sensor in the digital imaging device. The measured scene illumination is used to set the exposure time of the photo-sensor, the aperture of the lens system, and the intensity of the flash, when the flash is required.

Many digital imaging devices have at least two flash settings or modes. In one flash setting or mode, the digital imaging device fires the flash one or more times before the final flash used to capture the image. This flash mode is used to reduce the amount of redeye. Redeye occurs in images of people taken in low light environments while using a flash. The low light environment causes the iris to dilate. When using a flash in a low light environment the strobe light illuminates the blood vessels on the subjects' eye retina, causing the center part of the eye to look red. By firing the flash one or more times before the final flash (sometimes called pre-flashing), the pre-flash illumination causes the iris to close before the final exposure, thus reducing the amount of redeye in the captured image. Unfortunately, the pre-flash consumes energy. That is why most digital imaging devices also have a normal flash mode where the strobe only fires once when the image is captured. This normal mode saves energy but may result in images that contain large amounts of redeye.

Another way to reduce redeye is to increase the distance between the flash and the lens of the imaging device. In general, red-eye occurs when the angel created by drawing a line from the optical center of the lens to the subject's eyes and back to the flash is less than 2.5°. Equation 1 describes this relationship.

$$X=(Y/2)/\text{Tan } A \qquad \text{Equation 1}$$

Where: X is the camera-to subject distance, Y is the height of the flash above the optical axis of the lens, A is the angle created by the lens axis and the flash to the subject's eyes. To eliminate redeye A should be greater than 2.5°. The two variables we have to work with are camera-to-subject distance (reducing this increases A) and the distance of the flash from the lens (increasing this increases A). Unfortunately, most digital imaging devices are small, with the flash built in. This makes Y small, causing redeye to occur unless the subject is very close to the camera (within 1 to 3 feet).

Currently, users must manually choose between normal and redeye reduction flash modes. There is a need for a digital imaging device that can automatically switch between these flash modes, based upon the photographic situation.

SUMMARY OF THE INVENTION

A digital imaging system that automatically selects between normal and redeye reduction flash modes is disclosed. The digital imaging system measures the light in the scene and the distance to an object, and based on these measurements, chooses which flash mode to use.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
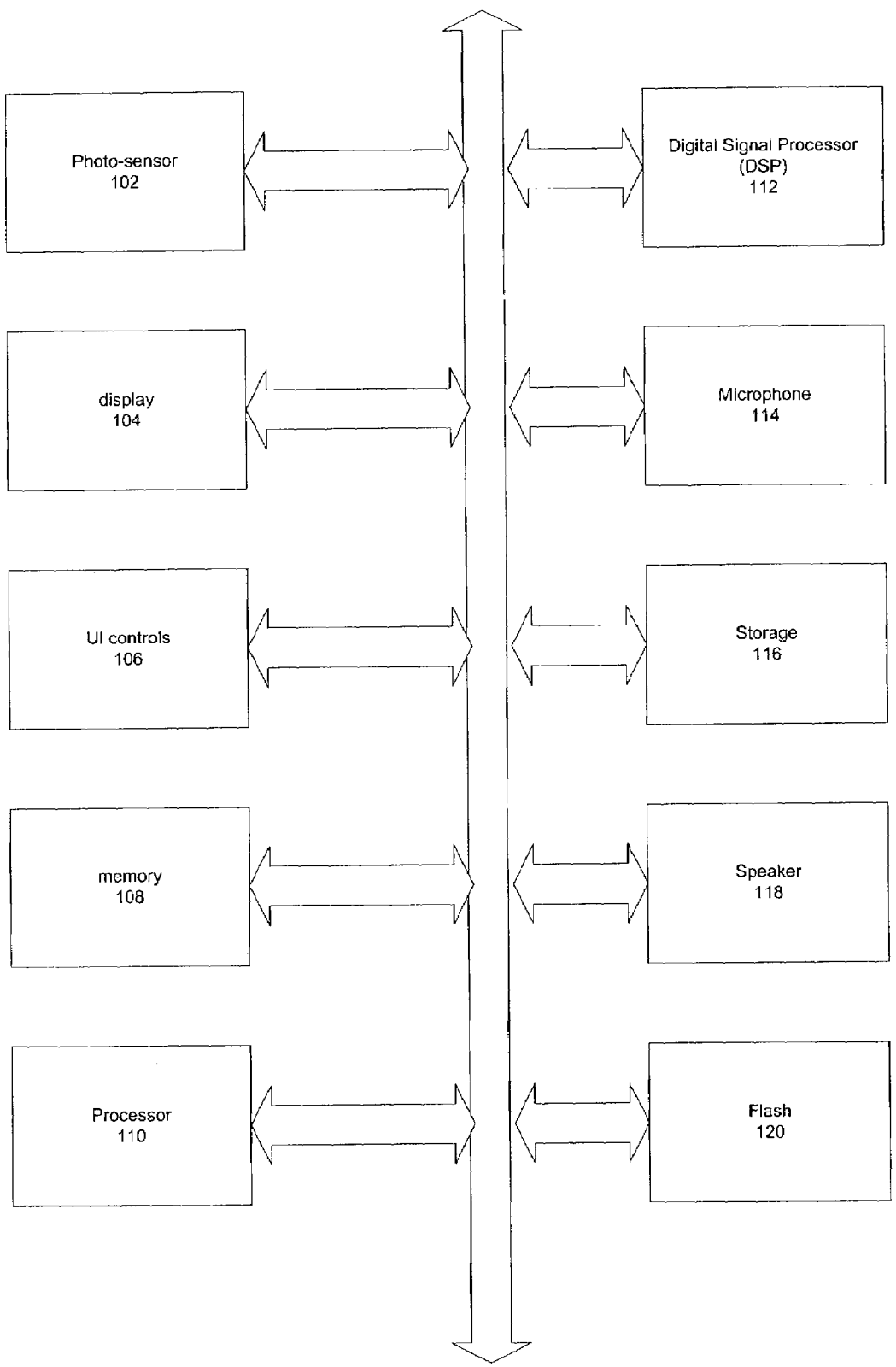
FIG. 1 is a block diagram of a digital imaging system in accordance with an example embodiment of the present invention.

A block diagram of a typical digital imaging device is show in FIG. 1. A lens (not shown) is used to form an image on a photo-sensor (102). A processor may be used to measure the brightness of the image captured by the photo-sensor (102). The processor used to measure the brightness may be a general-purpose processor, for example processor 110, or it may be a special purpose processor, for example digital signal processor 112. The measured scene brightness is used to set the shutter speed, the aperture, the exposure time of the CCD, and the power to the flash (when used). The strobe is activated typically when the resultant shutter speed drops below a preset threshold, for example $\frac{1}{100}$ of second. The reason behind this is to minimize camera motion imparted to the camera by the user holding the camera. Camera motion will result in blurry pictures that look like out of focus to the untrained eye. The exposure value (EV) of a scene is calculated using equation 2.

$$EV=BV+SV=Av+Tv \qquad \text{Equation 2}$$

Where:
 BV=Brightness Value of the scene (ft-lamberts)
 SV=Sensitivity Value (primarily a function of the sensor)
  $SV=\log_2 [ISO/3.125]$
 Av=Aperture Value (Lens aperture setting)
  $Av=2 \log_2 [f\#]$
 Tv=Time Value (shutter speed)
  $Tv=-\log_2$ [exposure time in seconds]

Figure 4:
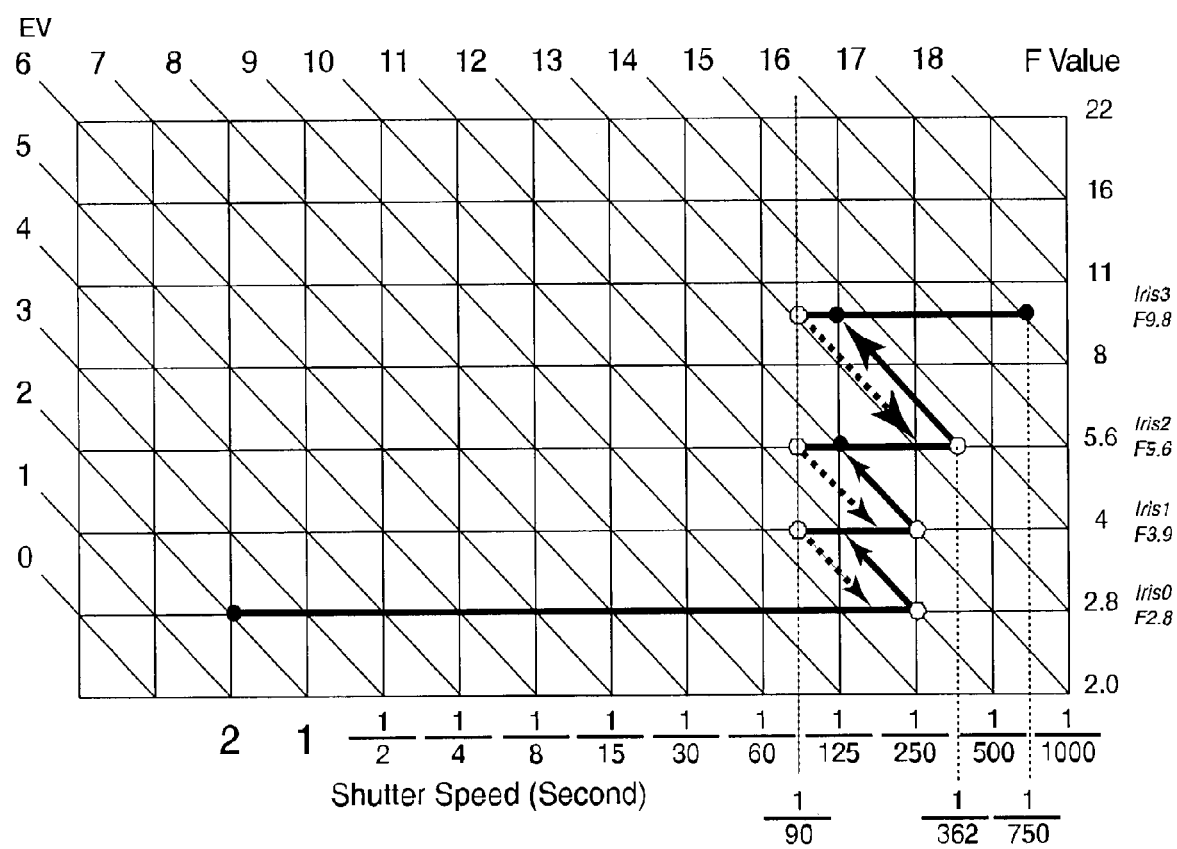
FIG. 4 is a graph of the relationship between EV, shutter speed, and F# in an example embodiment of the present invention.

FIG. 4 shows the relationship between EV, shutter speed and aperture size. In the FIG. 4, when the shutter speed drops below $\frac{1}{90}$ of a second, the automatic exposure program opens the aperture size. When the maximum aperture size is reached the AE program fires the strobe. Translating this into EV (Exposure value), $\frac{1}{90}$ of a second at F# 2.8 intersecting the diagonal EV lines results in an EV of 9.5. Therefore when the EV is less than 9.5 and the aperture is at maximum size, the strobe is fired.

Today most digital imaging devices have a flash (120) or strobe that operates in a plurality of modes. One mode is for redeye reduction, and another mode is a normal or "automatic" flash mode. In this application the normal flash mode is defined as where the strobe only fires once when capturing the image. The redeye reduction mode is defined as where the flash fires one or more times before the final flash used to capture the image. User typically selects which mode by using the UI controls (106) to select one of the strobe settings. Today, most strobe settings correspond to only one strobe mode. For example, to use the strobe in a redeye reduction mode, the redeye reduction setting must be selected. In the current invention, there is not necessarily a one-to-one correspondence between the UI strobe settings, and the strobe operating modes. Today, once the user has selected the flash setting, the digital imaging device will operate the flash in that mode even when the results may not be optimum for the selected mode. For example, when the user selects the normal or automatic flash mode the device will not pre-flash even when the subject is in a dark environment. This may cause an unacceptable amount of redeye in the subject. When the device is set in the redeye reduction mode, the device will pre-flash the flash even when the subject is in a relatively bright environment. This may waste energy when the flash was only needed to add fill illumination. For example, when the scene brightness is less than an EV of 9.5 but greater than an EV of 7, using the flash causes almost no noticeable redeye. Therefore using the redeye reduction mode wastes energy. Once the scene brightness goes below an EV of 4, using a flash causes a noticeable increase in redeye.

Figure 2:
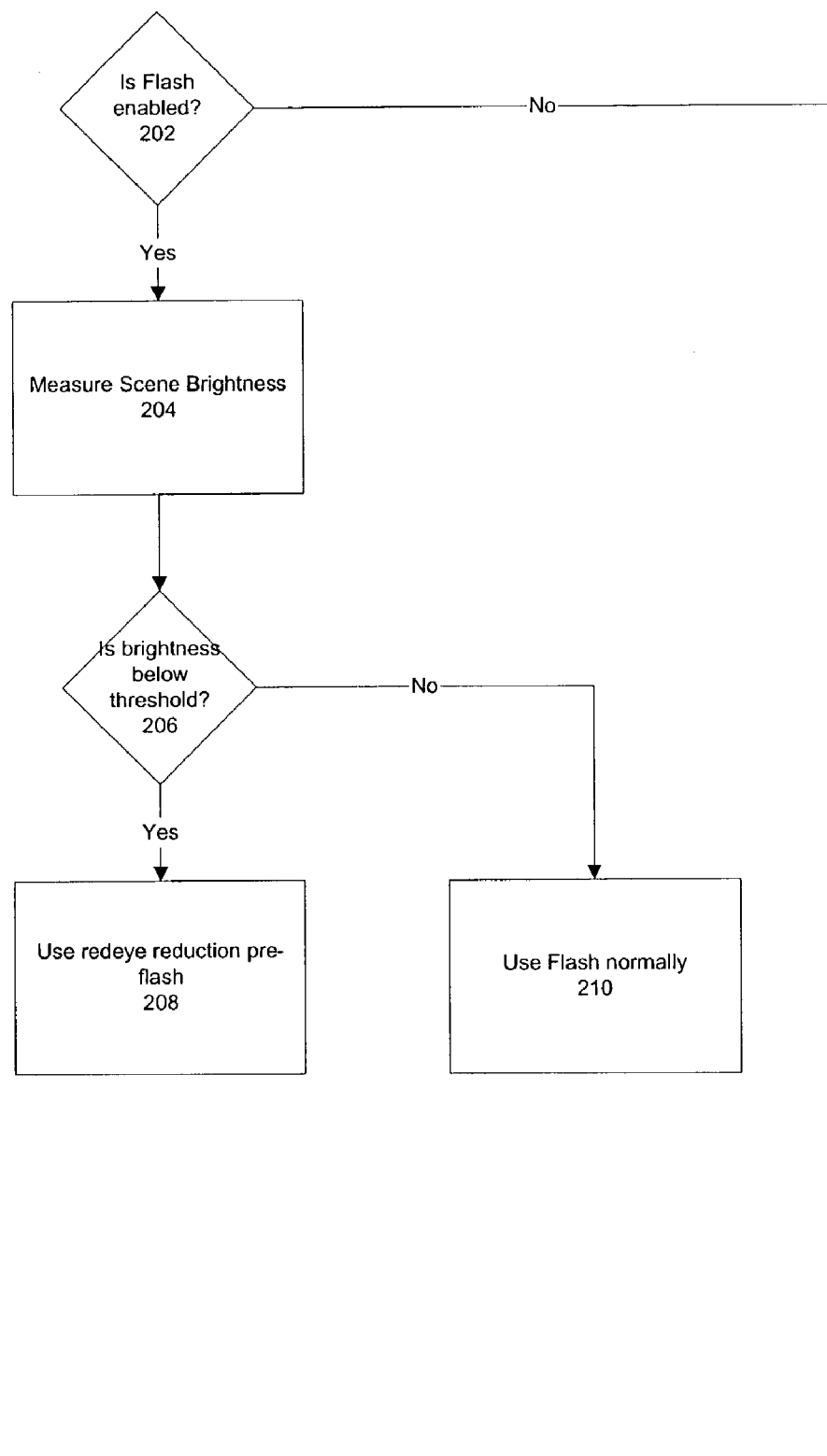
FIG. 2 is a flow chart for controlling a flash in accordance with an example embodiment of the present invention.
Figure 3:
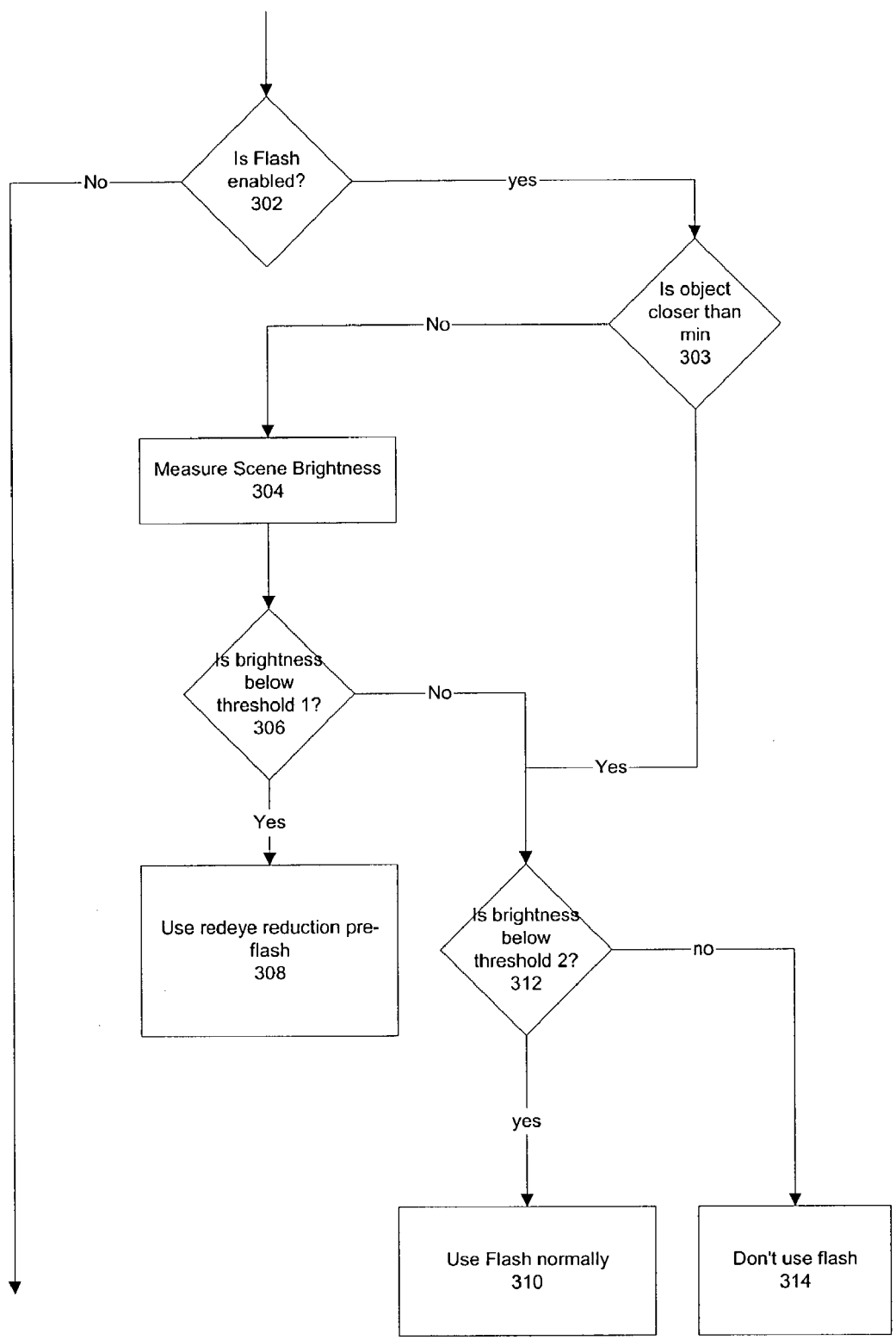
FIG. 3 is a flow chart for controlling a flash in another example embodiment of the present invention.

In one example embodiment of the current invention (see FIG. 2), the flash could be turned on or off. When the flash was enabled, the digital imaging device would measure the brightness of the scene (204) and use the redeye reduction pre-flash (208) only when the brightness was below a threshold value. When the brightness of the scene was equal to or above the threshold, the device would only fire the flash once for the capture of the final image (210). In the preferred embodiment the threshold would be set between an EV of 4 and an EV of 7. In this example embodiment, the "on" setting for the flash would enable two different operating modes for the strobe, the redeye reduction mode and the normal mode. The choice for what to call the "on" setting, is not critical and other names may be used, for example, "automatic" or "enabled".

In another example embodiment, when the brightness of the scene was below a first threshold (308) the flash would use the redeye reduction mode. When the brightness of the scene was above the first threshold, a second threshold would be checked (312). When the brightness of the scene was below the second threshold, but above the first threshold, the device would use the flash normally (310). When the flash was above the second threshold, the device would not use the flash at all (314).

In another example embodiment of the current invention, the flash would always be enabled. In this embodiment, the device would always measure the scene brightness. When the brightness was below a first threshold, the device would use the flash in the redeye reduction mode. When the brightness of the scene was above the first threshold but less than a second threshold, the device would use the flash normally. And when the brightness of the scene was above both thresholds, the device would not use the flash.). In the preferred embodiment the first threshold would be set between an EV of 4 and an EV of 7, and the second threshold would be set at approximately EV 9.5.

In another example embodiment, the flash would have three settings: a normal mode, a redeye reduction mode, and an automatic mode. When the flash was set to its normal mode the flash would only fire once for the capture of the final image. When the flash was set to its redeye reduction mode, the flash would always fire using a pre-flash before firing for the capture of the final image. And in the automatic mode the flash would switch between using the normal mode and the redeye reduction mode based on the measured scene brightness.

In another example embodiment, the distance to an object in the scene and the scene brightness would be used to determine when the redeye mode is used. The camera determines the distance to the object when auto-focusing. The distance between the lens and the built in flash is a known quantity, due to mechanical camera construction. Using equation 1, the angle A is determined. When angle A is greater than 2.5°, the flash will use normal mode. When angle A is less than 2.5° the scene brightness will be used to determine when the redeye reduction mode is used. The distance to the object can be determined using information in addition to or instead of the auto-focus distance. For example, a distance meter may be used, or the user may input the distance manually.

In the example embodiments above, a digital imaging device was used to explain the current invention. However, as one skilled in the arts would appreciate, this invention is not limited in use to only digital imaging devices. For example, a flash accessory could use this invention. The flash accessory could use a built in device for measuring brightness. In this configuration the flash could be used on both a digital imaging device or a film camera. In another configuration, the flash could use a sensor external to the flash, for example one built into the device attached to the flash. In another example embodiment, a traditional film camera may have a photo sensor and a flash built into the camera. The flash in the traditional film camera can use this invention to automatically switch between use models for its built in flash.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital imaging device comprising:
   a photo-sensor configured to capture images of a scene;
      a processor configured to measure the brightness of the scene using the captured images;
      a flash, the flash being used in at least two modes;
      the first flash mode configured to reduce redeye artifacts, the second flash mode configured to flash normally;
   the processor configured to automatically use the first flash modes when the brightness of the scene falls below a predetermined threshold and to use the second flash mode when the brightness of the scene is equal to or above the predetermined threshold;
   and where the processor is configured to not use the flash when the brightness of the scene is above a second threshold, the second threshold is higher than the predetermined threshold.

2. The digital imaging device of claim 1 where the predetermined threshold is set between an exposure value (EV) of 4 and an exposure value (EV) of 7.

3. The digital imaging device of claim 1 where the second threshold is set approximately at an exposure value (EV) of 9.5.

4. A method of controlling a flash, comprising:
measuring an illumination level in a scene;
automatically using the flash in a redeye reduction made when the illumination level is below a first threshold;
automatically using the flash in a normal mode when the illumination level is above or equal to the first threshold;
turning the flash off when the illumination level is above a second threshold, the second threshold being higher than the first threshold.

5. The method of claim 4 where the first threshold is set between an exposure value (EV) of 4 and an exposure value (EV) of 7.

6. The method of claim 4 where the second threshold is set approximately at an exposure value (EV) of 9.5.

7. The method of claim 4 where the flash is used with a digital camera.

8. The method of claim 4 where the flash is used with a film camera.

* * * * *

UNITED STATES PATENT AND TRADEMARK OFFICE
CERTIFICATE OF CORRECTION

PATENT NO.        : 7,180,545 B2                                              Page 1 of 1
APPLICATION NO. : 10/355692
DATED             : February 20, 2007
INVENTOR(S)       : Charles E. Schinner It is certified that error appears in the above-identified patent and that said Letters Patent is hereby corrected as shown below:

In column 4, line 53, in Claim 1, delete "the" and insert -- a --, therefor.

In column 4, line 54, in Claim 1, delete "the" and insert -- a --, therefor.

In column 4, line 57, in Claim 1, delete "modes" and insert -- mode --, therefor.

In column 5, line 6, in Claim 4, delete "made" and insert -- mode --, therefor.

Signed and Sealed this

Fifth Day of May, 2009

JOHN DOLL
*Acting Director of the United States Patent and Trademark Office*